(No Model.)

E. GOLDBACHER.
EYEGLASSES.

No. 298,744. Patented May 20, 1884.

WITNESSES
Henry F. Parker.
H. C. Hagen.

INVENTOR:
E. Goldbacher.
BY Geo. M. Hopkins
ATTORNEY.

UNITED STATES PATENT OFFICE.

ERNEST GOLDBACHER, OF NEW YORK, N. Y.

EYEGLASSES.

SPECIFICATION forming part of Letters Patent No. 298,744, dated May 20, 1884.

Application filed March 10, 1884. (No model.)

*To all whom it may concern:*

Be it known that I, ERNEST GOLDBACHER, residing in New York city, in the county and State of New York, have invented a new and useful Improvement in Eyeglasses, of which the following is a full, clear, and exact description, reference being had to the accompanying drawings, forming a part of this specification.

My invention relates to the class of eyeglasses supported upon the nose by the lateral pressure of two serrated springs; and it consists in forming a central longitudinal slot in each of the springs, into which the skin may project, and thereby assist in holding the eyeglasses in position upon the nose.

It further consists in inclining the slotted springs upon the bolster, so as to adapt the springs more perfectly to the form of the nose, and to admit of placing the glasses approximately at right angles to the line of vision.

Figure 1:
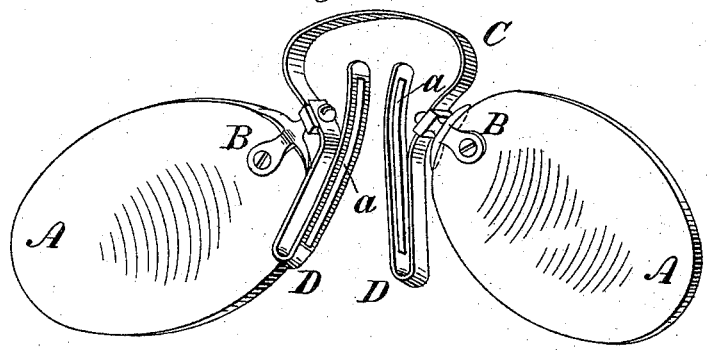
Figure 2:
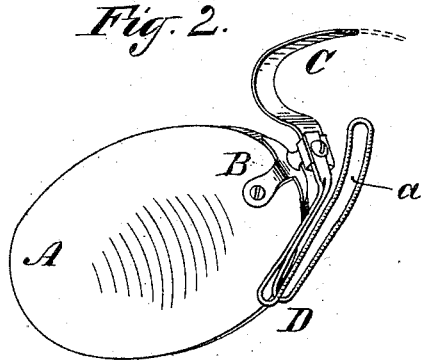
Figure 3:
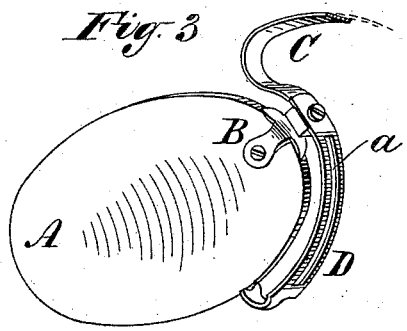
Figure 4:
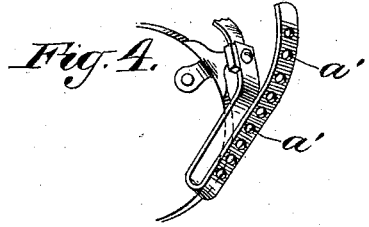

Figure 1 is a perspective view of a pair of eyeglasses embodying my invention. Figs. 2, 3, and 4 represent modified forms of the same.

Similar letters of reference indicate like parts in the different figures of the drawings.

The glasses A A are connected by clips B with the bow-spring C, in the usual manner.

The nose-springs D are attached by one end to the clips, and extend downward nearly parallel with the edge of the glass, thence upward at a slightly-divergent angle, and the two nose-springs thus attached are serrated upon the surface which contacts with the nose, and are provided with a central longitudinal slot, $a$, extending from the free ends to the lower angle thereof. The nose-springs D are twisted upon their connection with the clips, so as to form a small angle with the general plane of the eyeglasses, allowing the nose-springs to be placed in an inclined position upon the nose of the wearer, while the glasses are approximately at right angles with the center line of vision. This inclination of the nose-springs permits of a more comfortable and positive hold upon the nose, while permitting the wearer to look axially through the lens, thus avoiding the chromatic aberration resulting from an inclination of the glasses away from a plane perpendicular to the line of vision. The slotted form of the nose-springs D allows the skin on the sides of the nose to project into the slot $a$, forming a long narrow ridge, which, in connection with the serrations on the contact-surfaces of the nose-springs, retain the glasses firmly in their position upon the nose.

In the nose-springs shown in Fig. 2 the slot is continued from the free end of the springs to the clips, admitting of widening the slot $a$ by springing apart the two sides of the springs. In the form shown in Fig. 3, the nose-spring is bent downward parallel with the edge of the glass, and is provided with a slot, $a$, which extends from the bolster nearly to the free end of the spring.

In Fig. 4 I have represented a series of perforations, $a'$, in the nose-piece, which secure substantially the same result as the longitudinal slot. The perforations $a'$ may be circular, oblong, or of any other form to suit the taste of the manufacturer or user. A series of longitudinal, transverse, or oblique slots may be substituted for the longitudinal slot $a$, or the nose-spring may be perforated with scrolls or fret-work.

Having thus described my invention, what I claim as new, and desire to secure by Letters Patent, is—

1. In eyeglasses, a nose-spring slotted or perforated in the portion bearing on the nose, as herein specified.

2. In eyeglasses, a serrated nose-spring slotted longitudinally, as herein described, and inclined away from the general plane of the glasses.

ERNEST GOLDBACHER.

Witnesses:
CHAS. L. COHN,
GEO. M. HOPKINS.